July 6, 1926.
I. F. HARLOW ET AL
1,591,125
METHOD OF MAKING PHENYL ETHYL ALCOHOL AND LIKE COMPOUNDS
Filed Feb. 4, 1924
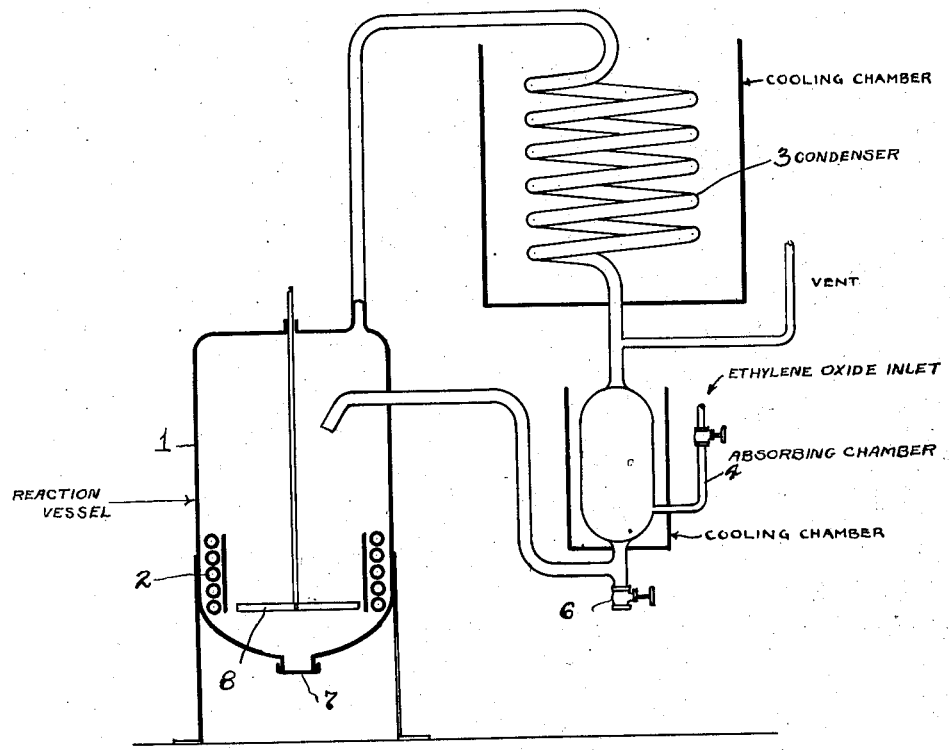
INVENTORS
Ivan F. Harlow and
BY Edgar C. Britton.
Fay, Oberlin + Fay
ATTORNEYS Patented July 6, 1926.

1,591,125

UNITED STATES PATENT OFFICE.

IVAN F. HARLOW AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING PHENYL ETHYL ALCOHOL AND LIKE COMPOUNDS.

Application filed February 4, 1924. Serial No. 690,477.

The use of organic magnesium compounds (RMgX) or of the so-called Grignard reagents with ethylene oxide in the preparation of primary alcohols has been fully disclosed by Grignard himself in reporting his own investigations (C. R. 136, 1260). Attention may also be called to the observations recorded by Blaise (C. R. 134, 551). However, so far as we are aware, no commercial development of this method has occurred, at least as directed to the preparation of phenyl ethyl alcohol ($C_6H_5.CH_2.CH_2OH$), this despite the fact that further attention has been directed to the preparation in this manner of such primary alcohols by Altweg (see U. S. Patent No. 1,316,619). The latter would distinguish from Grignard, who diluted the ethylene oxide with a large excess of ether and then cooled the resulting solution to —15° C. before addition to the reagent, by adding such ethylene oxide as a gas to the phenyl magnesium bromide in ether solution at a temperature around 0° C.; then, after allowing the mixture to stand, he removes the ether by adding benzene and distilling, thereby decomposing the ether complex, that is formed, by raising the temperature.

The explanation given for the reaction e. g. when phenyl ethyl alcohol is to be prepared is that the Grignard reagent, specifically

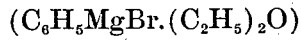

made from bromo-benzene and magnesium in ether solution, reacts first with ethylene oxide to form a complex and additive product

which, if the temperature is not raised, will decompose when treated with water to form chiefly bromo-hydrin and not phenyl ethyl alcohol. However, if the complex is heated phenyl ethyl alcohol is obtained. According to the process of Altweg this is accomplished by adding benzene and distilling, as noted above.

We have now discovered that ethylene oxide can be added at any temperature up to 110° C., if it has previously been dissolved in a suitable solvent, and in this manner we are enabled to synthetically prepare phenyl ethyl alcohol in a much more simple and expeditious manner than has ever heretofore been attained.

To the accomplishment of the foregoing and related ends the invention then consists of the steps hereinafter fully described and particularly pointed out in the claims, the following description and the annexed drawing setting forth but one of the various ways in which the principle of the invention may be used. The annexed drawing and the following description set forth in detail certain means and one mode of carrying out the invention, such disclosed means and mode illustrating, however, but one of various ways in which the principle of the invention may be used.

The chemical reaction apparatus shown in the drawing and herein described forms the subject-matter of a separate application filed June 15, 1925, Serial No. 37,102.

In said annexed drawing:

The single figure there appearing is a diagrammatic representation of the apparatus specially devised by us for the carrying out of our improved method.

In order to prepare phenyl ethyl alcohol, an ethereal solution of the proper Grignard reagent (RMgX), specifically the one hereinbefore referred to as made from bromo-benzene and magnesium, is placed in a reactor 1, or preferably is made directly therein. After it is made, it may or may not be treated with an aromatic hydrocarbon solvent such as benzene, toluene or xylene in order to raise its boiling point. Thereupon the reaction mixture, including such added solvent if used, is distilled by passing steam through the coil 2, or by other suitable means, the distillate being returned through condenser 3 and an absorbing chamber 4 back to the reactor. Connected with the absorber 4, preferably near its lower end, is a duct 5 through which ethylene oxide, which may be either in liquid or gaseous form, is admitted.

In either case, the ethylene oxide is dissolved and carried along with the refluxing distillate into the reactor, where we find that it will react with the Grignard reagent at any temperature from the boiling point of the ethereal solution (about 36° C.) to the boiling point of toluene (110° C.). After the reaction is complete, the ether present in the solution may be distilled off, or if desired, it may be distilled off and replaced by other solvents before adding the ethylene oxide. With the apparatus shown such removal of the ether is readily accomplished by simply opening the outlet valve 6 at the bottom of the condenser. In order to permit convenient removal of the contents of the reactor upon completion of the foregoing operation, a valve controlled outlet opening 7 is likewise provided at the bottom of such reactor. The latter also is equipped with a suitable stirrer 8 that is adapted to be externally driven.

The apparatus, it will be seen, is not only self-contained, but very simple and compact, while the process involves no refrigeration of the contents of the reactor, or other difficult and complicated control factors. It will, of course, be understood that before being discharged, the products of the reaction are cooled below the boiling point and that after such removal, a dilute mineral acid is added to free the phenyl ethyl alcohol. The latter is then separated and purified in any approved manner.

Since the problem involved in the process is the introduction of the ethylene oxide, the adaptation of such process to the preparation of other primary alcohols needs no further explanation, it being necessary merely to select the proper alkyl-magnesium-halogen compound.

Other modes of applying the principle of our invention may be employed instead of the one explained, change being made as regards the steps herein disclosed, provided those stated by any one of the following claims or their equivalents be employed.

We therefore particularly point out and distinctly claim as our invention:—

1. In a method of making primary alcohols using the Grignard reaction, the steps which consist in refluxing a solution of an organic magnesium haloid complex, and adding ethylene oxide to the returning distillate.

2. In a method of making primary alcohols using the Grignard reaction, the steps which consist in adding an aromatic hydrocarbon solvent to a solution of an organic magnesium haloid complex, refluxing, and adding ethylene oxide to the returning distillate.

3. The method of making phenyl ethyl alcohol using the Grignard reaction, which consists in refluxing a solution of phenyl-magnesium-haloid complex, and adding ethylene oxide to the returning distillate.

4. The method of making phenyl ethyl alcohol using the Grignard reaction, which consists in adding an aromatic hydrocarbon solvent to a solution of phenyl-magnesium-haloid complex, refluxing same, and adding ethylene oxide to the returning distillate.

Signed by us this 1st day of February, 1924.

IVAN F. HARLOW.
EDGAR C. BRITTON.